United States Patent
Falk et al.

(10) Patent No.: US 9,501,456 B2
(45) Date of Patent: Nov. 22, 2016

(54) AUTOMATIC FIX FOR EXTENSIBLE MARKUP LANGUAGE ERRORS

(71) Applicant: ALTOVA GMBH, Vienna (AT)

(72) Inventors: Alexander Falk, Marblehead, MA (US); Vladislav Gavrielov, Vienna (AT)

(73) Assignee: ALTOVA GMBH, Vienna (AT)

( * ) Notice: Subject to any disclaimer, the term of this patent is extended or adjusted under 35 U.S.C. 154(b) by 490 days.

(21) Appl. No.: 13/843,040

(22) Filed: Mar. 15, 2013

(65) Prior Publication Data

US 2014/0281925 A1    Sep. 18, 2014

(51) Int. Cl.
- G06F 17/22   (2006.01)
- G06F 9/44    (2006.01)
- G06F 17/27   (2006.01)

(52) U.S. Cl.
CPC .......... *G06F 17/2247* (2013.01); *G06F 8/33* (2013.01); *G06F 17/2725* (2013.01)

(58) Field of Classification Search
None
See application file for complete search history.

(56) References Cited

U.S. PATENT DOCUMENTS

| | | | |
|---|---|---|---|
| 7,146,422 B1 * | 12/2006 | Marlatt et al. | 709/227 |
| 7,149,966 B2 * | 12/2006 | Jones et al. | 715/234 |
| 7,213,201 B2 * | 5/2007 | Brown | G06F 17/24 715/234 |
| 7,296,017 B2 * | 11/2007 | Larcheveque et al. | |
| 7,373,595 B2 * | 5/2008 | Jones | G06F 17/2229 715/237 |
| 7,512,840 B2 * | 3/2009 | Martin | G06F 8/34 714/38.1 |
| 7,657,832 B1 * | 2/2010 | Lin | 715/237 |
| 8,078,961 B2 * | 12/2011 | Vion-Dury et al. | 715/234 |
| 8,413,041 B2 * | 4/2013 | Lee et al. | 715/234 |
| 2002/0120647 A1 * | 8/2002 | Amano | G06F 17/2217 715/234 |
| 2003/0110279 A1 * | 6/2003 | Banerjee et al. | 715/513 |
| 2003/0177115 A1 * | 9/2003 | Stern | G06F 17/30675 |
| 2003/0237048 A1 * | 12/2003 | Jones et al. | 715/513 |
| 2004/0002952 A1 * | 1/2004 | Lee et al. | 707/1 |
| 2004/0006744 A1 * | 1/2004 | Jones | G06F 17/2229 715/237 |
| 2004/0177321 A1 * | 9/2004 | Brown | G06F 17/24 715/234 |
| 2004/0205544 A1 * | 10/2004 | Aggarwal et al. | 715/512 |
| 2004/0226002 A1 * | 11/2004 | Larcheveque et al. | 717/126 |
| 2004/0268304 A1 * | 12/2004 | Kuo et al. | 717/109 |
| 2006/0041838 A1 * | 2/2006 | Khan | 715/513 |
| 2006/0064420 A1 * | 3/2006 | Jin | G06F 17/2247 |
| 2006/0218486 A1 * | 9/2006 | Zhao | 715/513 |
| 2009/0254812 A1 * | 10/2009 | Vion-Dury et al. | 715/239 |
| 2013/0283156 A1 * | 10/2013 | Al Badrashiny et al. | 715/257 |

* cited by examiner

*Primary Examiner* — Maikhanh Nguyen
(74) *Attorney, Agent, or Firm* — Chapin Intellectual Property Law, LLC

(57) ABSTRACT

Methods and apparatus, including computer program products, for an automatic fix for extensible markup language (XML) errors. A method includes detecting a location causing an error in a markup language document, displaying the location and the error on the display unit, analyzing the error and underlying causes of the error, computing a set of possible actions to remedy the error, displaying information about the error and its underlying causes on the display unit, and displaying the set of possible actions to remedy the error on the display unit.

12 Claims, 4 Drawing Sheets

*FIG. 3*

AUTOMATIC FIX FOR EXTENSIBLE MARKUP LANGUAGE ERRORS

BACKGROUND OF THE INVENTION

The invention generally relates computer systems and computer executed methods, and more specifically to an automatic fix for extensible markup language (XML) errors.

In most Extensible Markup Language (XML) development environments, an XML editor reports two types of errors, i.e., well-formedness and validation errors. Typically, a line with a well-formedness/validation error or warning is marked in an editor panel by underlining an error region with a color. Also a colored sign will mark the position in the document of that line on the right side ruler of the editor panel. The same will happen for a validation warning, only the color indicating the warning will be different. However, it is up to the developer to decipher the errors and correct the errors, wasting precious development time.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for an automatic fix for extensible markup language (XML) errors.

In general, in one aspect, the invention features a method including, in a computing system having at least a processor, a memory and a display unit, detecting a location causing an error in a markup language document, displaying the location and the error on the display unit, analyzing the error and underlying causes of the error, computing a set of possible actions to remedy the error, displaying information about the error and its underlying causes on the display unit, and displaying the set of possible actions to remedy the error on the display unit.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 3 is an exemplary graphical user interface (GUI).

DETAILED DESCRIPTION

Figure 1:
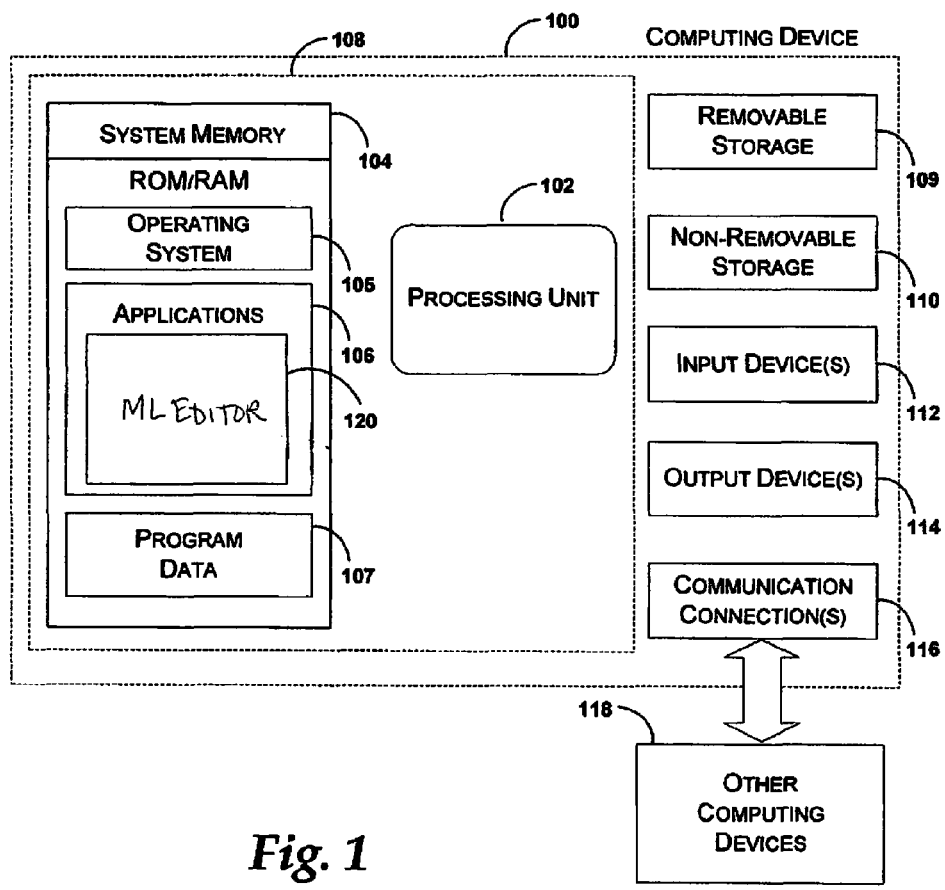
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Throughout the specification and claims, the following terms take the meanings explicitly associated herein, unless the context clearly dictates otherwise.

The terms "extensible markup language" or "XML" refer to a language for special codes within a document that specify how parts of the document are to be interpreted by an application. In an XML file, the markup language specifies how the text is to be formatted or laid out, whereas in a particular custom schema, the XML tends to specify the text's structural function (e.g., heading, paragraph, and so forth).

The term "element" refers to the basic unit of an XML document. The element may contain attributes, other elements, text, and other building blocks for an XML document.

The term "tag" refers to a command inserted in a document that delineates elements within an XML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Although the present invention is described in the context of an XML development environment, the principles of the present invention may be adapted to other software development environments.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a ML editor 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, and so forth, may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
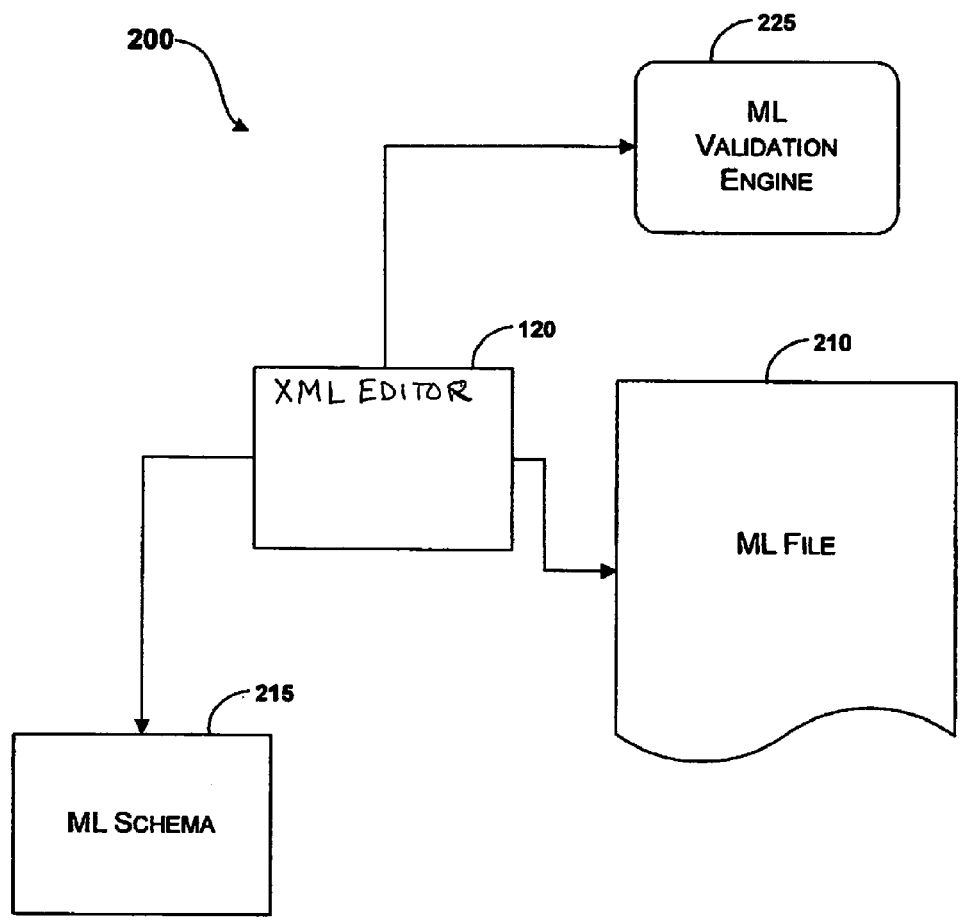
FIG. 2 is a block diagram.

FIG. 2 is a block diagram illustrating an exemplary environment for practicing the present invention. The exemplary environment shown in FIG. 2 is an XML development environment 200 that includes an XML editor 120, XML file 210, XML Schema 215, and XML validation engine 225.

XML editor 120 internally validates ML file 210 and reports errors, if present. When validated, the XML elements are examined as to whether they conform to the XML schema 215. As previously described above, a schema states what tags and attributes are used to describe content in an XML document, where each tag is allowed, and which tags can appear within other tags, ensuring that the documentation is structured the same way. Accordingly, XML file 210 is valid when structured as set forth in arbitrary XML schema 215.

XML validation engine 225 operates similarly to other available validation engines for ML documents. XML validation engine 225 evaluates XML that is in the format of the XML validation engine 225.

As described above, in most XML development environments, an XML editor reports two types of errors, i.e., well-formedness and validation errors.

A Well-Formed XML document is a document that conforms to the XML syntax rules. A Namespace Well-Formed XML document is a document that is XML Well-Formed and is also namespace-wellformed and namespace-valid.

For example, the XML Syntax rules for Well-Formed XML include all XML elements must have a closing tag, XML tags are case-sensitive, all XML elements must be properly nested, all XML documents must have a root element, attribute values must always be quoted and with XML, white space is preserved.

A Valid XML document is a Well Formed XML document, which also conforms to the rules of a schema which defines the legal elements of an XML document. The schema type can be XML Schema, Relax NG (full or compact syntax), Schematron, Document Type Definition (DTD), or Namespace-based Validation Dispatching Language (NVDL). The purpose of the schema is to define the legal building blocks of an XML document. It defines the document structure with a list of legal elements.

Typically, a line with a well-formedness/validation error or warning is marked in an editor panel by underlining an error region with a color. However, it is up to the developer to decipher the errors and correct the errors, wasting precious development time.

In the present invention, the XML editor 120 includes a smart fix process 400. The smart fix process 400 presents, through a smart fix pane of a validator message window, options for fixing validation errors that developers can apply automatically, with a single click. In addition to reporting comprehensive information about validation errors, the smart fix process 400 enumerates one or more possible corrections for fixing them, and will make the required changes automatically, based on the user's selection. This reduces the time spent troubleshooting and testing considerably.

The smart fix process 400 provides granular details about each validation error, including the reason for the error, a link to the error in the working XML file, a link to the corresponding definition(s) in the associated schema file, and links to relevant information in the applicable W3C specification.

More specifically, the smart fix process 400 enables a mechanism to act upon validation errors and well-formedness errors detected in XML documents. The smart fix process 400 is designed to cover error conditions defined by the XML standard and other standards subsequently based on it, such as, for example, XML Namespaces and XML Schema as defined by the World Wide Web Consortium (W3C).

Acting on the above error conditions includes analyzing the specific circumstances of an error, computing a set of possible actions to remedy the error and offering these actions to the user who triggered the validation process. The actions, in turn, can include one or more elementary actions, such as, but not limited to, the example actions listed below.

(1) Insert sample (i.e., default) element.
(2) Insert element.
(3) Append sample (i.e., default) child element.
(4) Append child element.
(5) Append sample (i.e., default) attribute.
(6) Append attribute.
(7) Set value (of a text child or an attribute).
(8) Rename.
(9) Delete.
(10) Delete attributes and children.
(11) Delete only child elements.
(12) Delete children.
(13) Delete all attributes.
(14) Delete text content.
(15) Move before element.
(16) Move after element.
(17) Swap elements.
(18) Replace arbitrary text addressed by offset and length.

While there are numerous different error conditions, the problems posed by these error conditions generally fall into five basic categories:

First, a part of the XML structure (element, attribute, text, comment, processing instruction, start tag, end tag, and so forth) is not allowed under the circumstances of the respective rule which raised the error condition but the condition could be resolved by (recursive) deletion.

Second, an element is not allowed at its current position by the parent element's content model but it would be allowed at another position within the same content model.

Third, a text value (of an element or attribute), the name of an element or attribute or that of a start or end tag is not allowed or would cause subsequent errors as it was specified but one or more acceptable values can be computed and suggested from the closest semblance to the least semblance with what the user provided, in order.

Fourth, an element or attribute is missing but the details required to create it in order to resolve the problem directly follow from the specific circumstances of the latter.

Fifth, an element or attribute is missing but a valid sample could be generated that would at least stop the error from occurring.

The smart fix process 400 not only offers to correct an error based on the above categories, the smart fix process 400 offers as many different ways of correction as possible. The suggestions presented will typically cover multiple categories and the user is given a choice as to which of the possible fixes should be applied.

As an example, the suggestions to correct a value which is subject to an XML Schema simple type are computed by the smart fix process 400 with the help of a cascaded strategy. An example of such a strategy follows.

(1) Type-specific corrections of the offending value. The actual information is extracted as it is probably intended and subsequently put together with the proper syntax of the respective simple type. This approach may include, but not limited to, detecting and ignoring digit grouping characters (e.g., the comma in English-speaking countries), detecting and converting syntactically disapproved decimal separators (e.g., the comma in German-speaking countries), detecting the order of the parts of a given date and rearranging them according to the requirements of the simple type, and so forth.

(2) Brute-force attempts to remove invalid characters from the string. The results of this step are the left substring before the first offending character and, secondly, a version of the string from which all invalid characters have been deleted.

(3) Computing and offering enumeration values defined for the simple type.

The smart fix process 400 may include further logic, such as considering more constraining facets, to maximize the probability of finding an acceptable value. If all attempts fail, the smart fix process 400 is unable to make a suggestion.

Whenever a list of possible alternatives is presented by the smart fix process 400 to the user, such as enumerated values of a simple type, alternative QNames within a schema's symbol space, and so forth, the list may be sorted by an edit distance metric, such as, for example, the Damerau-Levenshtein distance, with respect to the originally provided character string posing the reason for the error to occur. Other distance metric logic may also be used.

Figure 3:
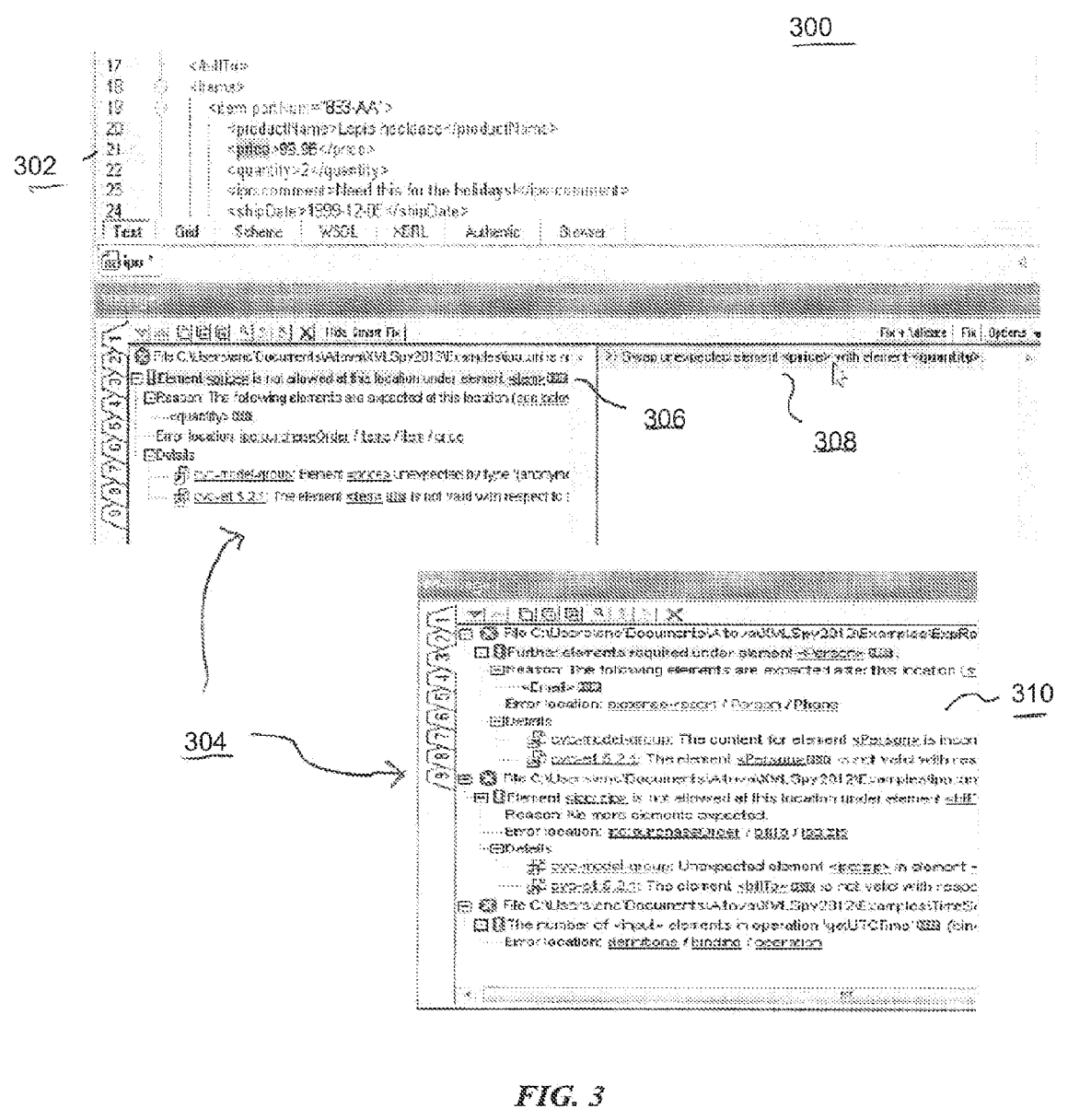

As shown in FIG. 3, an exemplary XML editor UI 300 includes an exemplary validation pane 302 and associated exemplary smart fix pane 304. In this example, an error has occurred at line 21, i.e., <price>. The smart fix process 400 generates a message 306 in the smart fix pane 304 pertaining to this error, and in this specific example, generates a message 308 with a suggested fix to this error. More specifically, the smart fix process 400 message 306 indicates that element <price> is not allowed at this location, specifies a reason, an error location and details. Message 208 suggests swapping unexpected element <price> with element <quantity>. If the user agrees with this suggestion, the user need only click on the suggested solution and <price> is replaced by <quantity> at line 21. Content 310 displays information about the error that may include one or more of a link to the error in the working XML file, a link to the corresponding definition(s) in an associated schema file, and links to relevant information in an applicable W3C specification.

Figure 4:
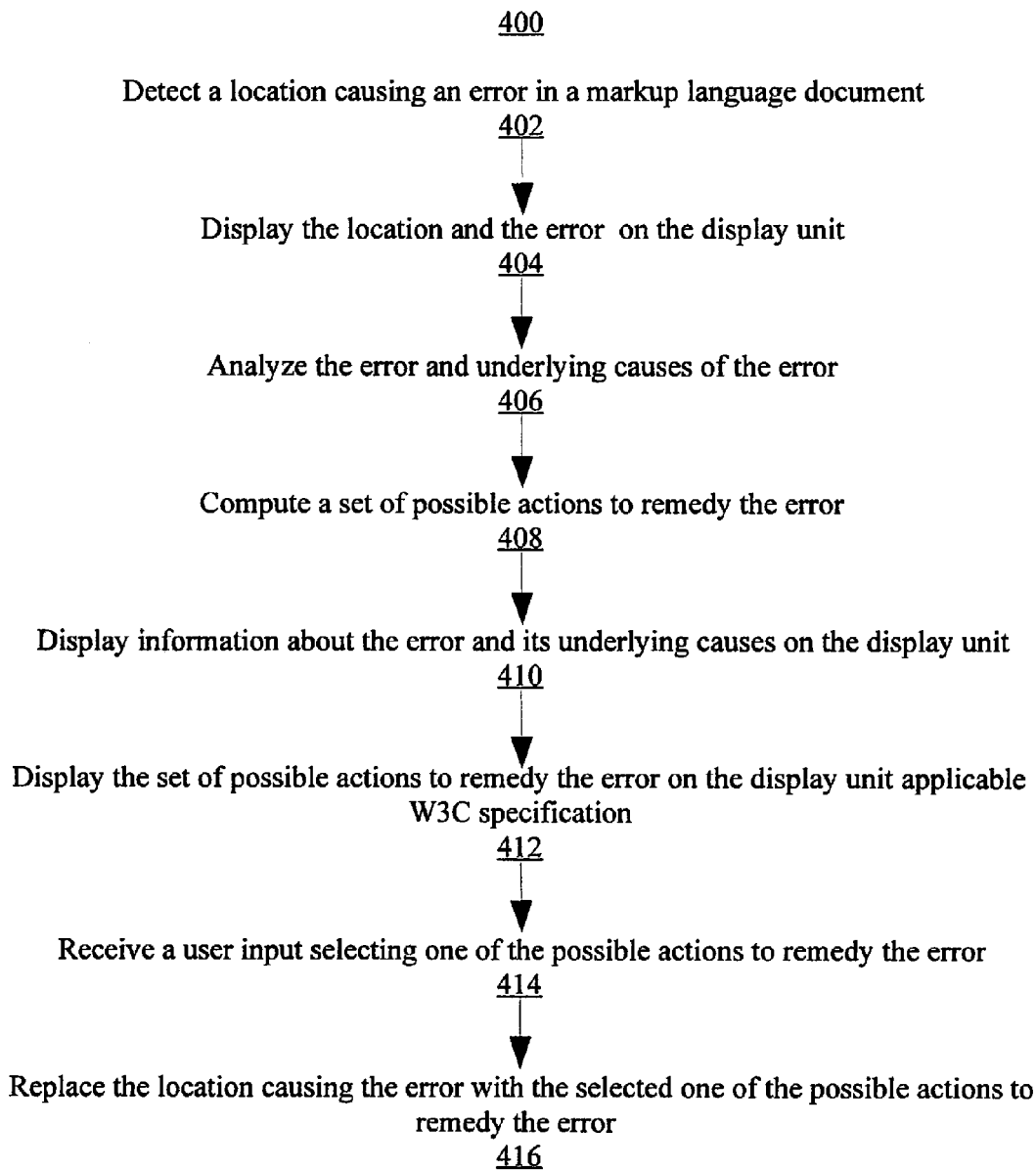
FIG. 4 is a flow diagram.

As shown in FIG. 4, the smart fix process 400 includes detecting (402) a location causing an error in a markup language document. The smart fix process displays (404) the location and the error on the display unit.

The smart fix process 400 analyzes (406) the error and underlying causes of the error and computes (408) a set of possible actions to remedy the error.

The smart fix process 400 displays (410) information about the error and its underlying causes on the display unit and displays (412) the set of possible actions to remedy the error on the display unit. Information about the error may include one or more of a link to the error in the working XML file, a link to the corresponding definition(s) in an associated schema file, and links to relevant information in an applicable W3C specification.

The smart fix process 400 receives (414) a user input selecting one of the possible actions to remedy the error and replaces (416) the location causing the error with the selected one of the possible actions to remedy the error. User input may be a received mouse-click.

In summary, the smart fix process 400 provides options for fixing XML validation errors that a user can apply automatically, with a single click. In the smart fix pane of the validator message window, possible corrections for fixing each error are enumerated and the required changes automatically inserted based on the user's selection. The user has full control over which fix is implemented, but the smart fix process 400 will make the selected change automatically, reducing the time spent troubleshooting and testing considerably.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   in a computing system having at least a processor, a memory and a display unit, detecting a location causing an error in a markup language document;
   displaying the location and the error in the markup language document on the display unit;
   analyzing the error in the markup language document and underlying causes of the error in the markup language document;
   computing a set of possible actions to remedy the error in the markup language document;
   displaying information about the error in the markup language document and its underlying causes on the display unit;
   displaying the set of possible actions to remedy the error in the markup language document on the display unit;
   receiving a user input selecting one of the possible actions to remedy the error in the markup language document; and
   replacing the location causing the error in the markup language document with the selected one of the possible actions to remedy the error in the markup language document,
   wherein the information about the error in the markup language document and its underlying causes comprises:
   a link to the error in the working XML file;
   a link to the corresponding definition(s) in an associated schema file; and
   links to relevant information in an applicable W3C specification.

2. The method of claim 1 wherein the markup language document is an Extensible Markup Language (XML) document.

3. The method of claim 2 wherein the error indicates a part of the XML document structure is not allowed under circumstances of a respective rule that raised the error condition but the condition can be resolved by deletion.

4. The method of claim 2 wherein the error in the markup language document indicates an element is not allowed at its current position by a parent element's content model but would be allowed at another position within the same content model.

5. The method of claim 2 wherein the error in the markup language document indicates a text value of an element or attribute, a name of an element or attribute or that of a start or end tag is not allowed or would cause subsequential errors as it was specified but one or more acceptable values can be computed and suggested from the closest semblance to the least semblance with what the user provided, in order.

6. The method of claim 2 wherein the error in the markup language document indicates an element or attribute is missing but the details required to create it in order to resolve the problem directly follow from the specific circumstances of the latter.

7. The method of claim 2 wherein the error in the markup language document indicates an element or attribute is missing but a valid default can be generated that would at least stop the error in the markup language document from occurring.

8. The method of claim 1 wherein set of possible actions is selected from the group consisting of insert default element, insert element, append default child element, append child element, append default attribute, append attribute, set value of a text child or an attribute, rename, delete, delete attributes and children, delete only child elements, delete children, delete all attributes, delete text content, move before element, move after element, swap elements, and replace arbitrary text addressed by offset and length.

9. The method of claim 1 wherein computing the set of possible actions to remedy the error comprises:
   type-specific corrections of an offending value;
   brute-force attempts to remove invalid characters from a string; and
   computing and offering enumeration values defined for a simple type.

10. The method of claim 9 further comprising logic to maximize a probability of finding an acceptable value.

11. The method of claim 1 wherein the set of possible actions to remedy the error is sorted by an edit distance metric with respect to an originally provided character string posing the reason for the error to occur.

12. The method of claim 11 wherein the edit distance metric is a Damerau-Levenshtein distance.

* * * * *

Disclaimer

9,501,456 B2 - Alexander Falk, Marblehead, MA (US); Vladislav Gavrielov, Vienna (AT). AUTOMATIC FIX FOR EXTENSIBLE MARKUP LANGUAGE ERRORS. Patent dated November 22, 2016. Disclaimer filed February 25, 2020, by the assignee, Altova GmbH.

I hereby disclaim the following complete Claims 1, 2, 3, 4, 5, 6, 7, 8, 9, 10, 11 and 12 of said patent.

*(Official Gazette, January 13, 2026)*